United States Patent [19]
Mahon et al.

[11] Patent Number: 5,477,369
[45] Date of Patent: Dec. 19, 1995

[54] DEVICE FOR OPTICAL HETERODYNE OR HOMODYNE DETECTION OF AN OPTICAL SIGNAL BEAM AND RECEIVER PROVIDED WITH SUCH A DEVICE

[75] Inventors: Mahon, Cathal J., Copenhagen, Denmark; Giok D. Khoe, Eindhoven, Netherlands

[73] Assignee: U.S. Philips Corporation, New York, N.Y.

[21] Appl. No.: 798,265

[22] Filed: Dec. 19, 1995

Related U.S. Application Data

[63] Continuation of Ser. No. 148,805, Jan. 27, 1988, abandoned, which is a continuation-in-part of Ser. No. 40,444, Apr. 20, 1987, abandoned.

[30] Foreign Application Priority Data

Sep. 9, 1987 [NL] Netherlands ............... 8702307

[51] Int. Cl.⁶ ..................................... H04B 10/06
[52] U.S. Cl. ................ 359/189; 359/190; 359/191; 359/192
[58] Field of Search ................ 359/189, 190, 359/191, 192

[56] References Cited

U.S. PATENT DOCUMENTS

| | | | |
|---|---|---|---|
| 4,506,388 | 3/1985 | Monerie | 455/616 |
| 4,697,284 | 9/1987 | Glance | 455/619 |
| 4,752,120 | 6/1988 | Shimizu | 455/616 |
| 5,124,828 | 6/1992 | Mahon | 359/192 |

FOREIGN PATENT DOCUMENTS

| | | | |
|---|---|---|---|
| 0250819 | 1/1988 | European Pat. Off. | 455/616 |
| 0023121 | 6/1986 | Japan | 455/616 |
| 62-10937 | 1/1987 | Japan | 455/616 |

OTHER PUBLICATIONS

Noe, "Endless Polarisation Control Het/Homodyne Receivers", Fiber Optics vol. 630, May 1986.
Noe, "Endless Polarization Control Experiment with Three Elements of Limited Birefrengent Range." Electronic Letters 124–86 vol. 22 #25.
Okoshi, "Polarization Control Scheme for Optical Heterodyne Receiver Using 2 Faraday Rotators " Electronic Letters, vol. 21 #18, Aug. 21, 1985 pp. 787–788.
Okoshi, "Polarization–State Control Schemes for Heterodyne or Homodyne Optical Fiber Communications", Journal of Lightwave Tech. vol. LT3#6, pp. 1232–1237.

*Primary Examiner*—Leo H. Boudreau
*Assistant Examiner*—Y. Negash
*Attorney, Agent, or Firm*—Anne E. Barschall

[57] ABSTRACT

A device for optical heterodyne detection is described, using only two adjustable elements influencing the state of polarisation and having a limited control range (51, 52) in order to realize an endless polarisation control. In a first embodiment a temporary loss of signal intensity of at most 3 dB is accepted. This signal loss is avoided if a circuit of non-adjustable optical components (81, 82, 83) is incorporated in the heterodyne detection device.

18 Claims, 4 Drawing Sheets

DEVICE FOR OPTICAL HETERODYNE OR HOMODYNE DETECTION OF AN OPTICAL SIGNAL BEAM AND RECEIVER PROVIDED WITH SUCH A DEVICE

This is a continuation of application Ser. No. 07/148,805, filed on Jan. 27, 1988, now abandoned, which is a continuation-in-part of application Ser. No. 07/040,444, filed Apr. 20, 1987, now abandoned.

BACKGROUND OF THE INVENTION

1. Field of the Invention

The invention relates to a device for optical heterodyne or homodyne detection of an optical signal beam. The device includes a local oscillator, a beam-combining element for combining radiation from the local oscillator with radiation from the signal beam, at least one opto-electrical converter for converting combined optical radiation into an electric signal, a plurality of adjustable elements influencing the state of polarisation and having a limited control range and a control circuit for adjusting the elements influencing the state of polarisation. The control circuit is adapted for endless control of a state of polarisation. The invention also relates to a receiver for receiving optical signals, provided with such a device.

2. Prior Art

As compared with direct detection of an optical signal beam, heterodyne or homodyne detection provides considerable advantages relating to the signal-to-noise ratio and discriminating from background radiation. The principle of heterodyne detection of optical radiation has been extensively described in the Article "Optical Heterodyne Detection" by O. E. DeLange in the Journal "IEEE Spectrum" of October 1968, pages 77–85. As has been stated in this Article, it is important that the states of polarisation of the modulated signal beam and of the local oscillator beam correspond as much as possible.

Optical transmission systems make use of optical waveguides or optical fibres. These waveguides or fibres may be dozens to several hundred kilometers long and are subjected to uncontrollable external influences such as temperature, stress and pressure variations. The state of polarisation of the radiation propagating through the fibre is disturbed by these influences. A signal beam which is linearly polarized at the input of the fibre will generally have an elliptical state of polarisation at the output. Since the external influences vary with time, the ellipticity and the orientation of the polarisation ellipse also vary.

In order to compensate for the signal beam state of polarisation varying with time, a polarisation control of the signal beam or of the local oscillator beam is necessary. The Article "Endless polarisation control experiment with three elements of limited birefringence range" by R. Noé in the Journal "Electronics Letters", Vol. 22, No. 25 (1986), pages 1341–1343 describes such a polarisation control in which the state of polarisation of the signal beam can be endlessly compensated by means of three adjustable elements influencing the state of polarisation and each having a limited control range. Within the scope of the present invention, endless control is to be understood to mean a compensation control enabling the state of polarisation of the signal beam to be tracked in the case of a continued change of this state in the same direction so that the difference between the states of polarisation of the two beams does not become so large at any instant that there is serious signal loss of the signal ultimately detected by the detection device. For a polarisation control in which all adjustable elements have a limited control range this means that, if one of the elements influencing the state of polarisation tends to exceed the limit of its control range, it must be possible to readjust this element, whilst the polarisation compensation and hence the signal reception is largely maintained by suitable manipulation of the adjustments of the other elements.

It is to be expected that optical transmission systems will be widely used, not only for transmitting information between central stations but also for distributing information from a central station to, for example subscriber terminal stations. It is particularly important for such a terminal station that the detection device present therein is relatively inexpensive and hence is equipped with a minimum number of controllable components and the associated control circuits.

SUMMARY OF THE INVENTION

It is an object of the present invention to provide such a device.

The device according to the invention is characterized in that there are only two adjustable elements influencing the state of polarisation. As will be further described hereinafter, it has been found that a sufficient conformity between the states of polarisation of the signal beam and the local oscillator beam can be maintained by means of two adjustable elements influencing the state of polarisation, provided that certain further conditions are satisfied.

A first embodiment, which is the simplest from a constructive point of view, can be used if a sufficiently large signal intensity of the signal beam is available because in this embodiment an attenuation of at most 3 dB may occur in the ultimately detected signal when readjusting one of the elements influencing the state of polarisation. The signal intensity should be larger than the so-called "shot noise limit", or in other words, the noise level which is produced in the opto-electrical converter due to the conversion from an optical signal to an electric signal.

A second embodiment of the device according to the invention is characterized in that a polarisation-sensitive beam splitter and a further beam-combining element are arranged in the radiation path between the elements influencing the state of polarisation and the said beam-combining element, said polarisation-sensitive beam splitter splitting the radiation path into two branches which are combined again in the further beam-combining element, whilst one of the branches accommodates a state of polarisation converter for converting the state of polarisation of the polarized radiation through this branch into the orthogonal state of polarisation. Consequently, the state of polarisation of the signal beam is converted by the beam splitter and the further beam-combining element into a linear state of polarisation. The intensity of each of the two sub-beams in the two branches and the phase difference between them at the inputs of the further beam-combining element are determined by the adjustable elements influencing the state of polarisation. Thus, by the adjustable elements, the extent of interference between the two sub-beams is determined in the further beam-combining element. It is possible to readjust the one element influencing the state of polarisation, while the state of polarisation is influenced with the aid of the other element in such a manner that a decrease of the signal intensity is avoided. By suitably adapting the optical path lengths of the two branches in conformity with a selected fixed phase difference in the two sub-beams, a maximum amplitude of the signal beams exiting from the further beam-combining element is obtained.

The embodiments of the device according to the invention may be further characterized in that the said beam-combining element has two outputs from which radiation is incident on two opto-electrical converters which convert the radiation into electric signals and whose outputs are connected to the inputs of a differential amplifier. By means of balanced detection substantially all radiation from the further beam-combining element is detected. Since the signals from the two outputs are in anti-phase, the AC components present therein are added together and the DC components which are present in the electric signals are cancelled. The DC components originate from high-frequency components in the combined optical radiation beams.

The device according to the invention may be further characterized in that the two adjustable elements influencing the state of polarisation are arranged in the radiation path of the signal beam. Consequently, the state of polarisation of the signal beam is adapted to the constant state of polarisation of the local oscillator.

A further embodiment of the device according to the invention is characterized in that the two adjustable elements influencing the state of polarisation are linearly birefringent elements. These elements are inexpensive and have no moving parts. They may be, for example piezo-electric fibre squeezers generating a stress or pressure and hence a birefringent effect in the fibre.

However, a device according to the invention may also be characterized in that at least one of the two adjustable elements influencing the state of polarisation is an element rotating the direction of polarisation. Such an element may be arranged with small coupling losses in the radiation path and may be, for example, in the form of a Faraday rotator.

BRIEF DESCRIPTION OF THE DRAWING

The invention will now be described in greater detail by way of example with reference to the accompanying drawings in which.

DETAILED DESCRIPTION OF THE PREFERRED EMBODIMENTS

Figure 1:
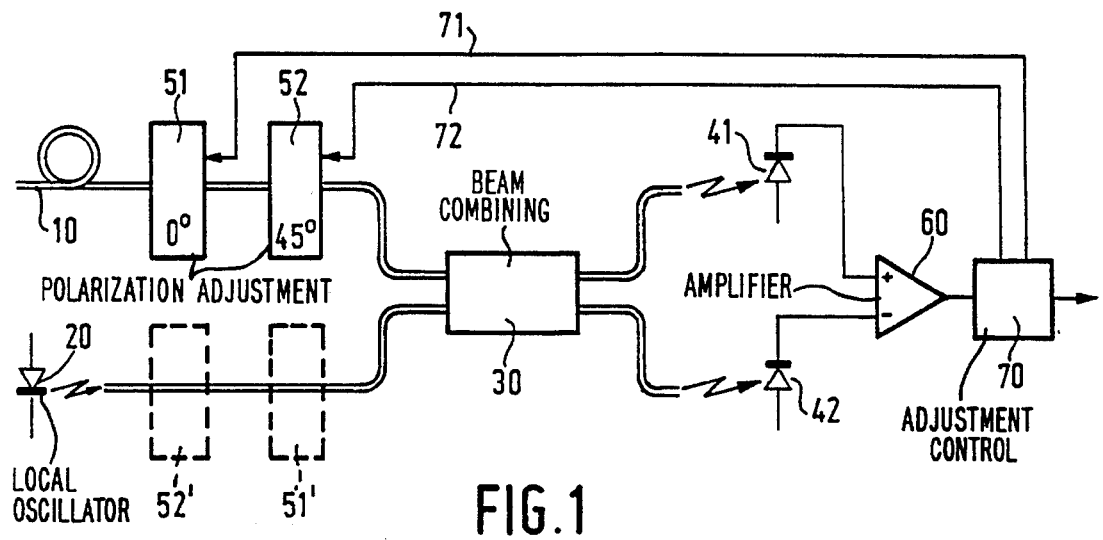
FIG. 1 shows diagrammatically a first embodiment of the device according to the invention.

In FIG. 1 the reference numeral 10 denotes the last part of a long-distance single-mode optical transmission fibre. The signal beam propagating through this fibre is mixed in a beam-combining element 30 with radiation from a local oscillator 20, for example a semi-conductor laser. The radiation exiting from the element 30 is detected by means of two opto-electrical converters 41 and 42. In FIG. 1 the beam-combining element is shown as a fibre-optic coupler, but an element of a different type having a comparable function, for example a semi-transparent mirror can alternatively be used. Instead of two opto-electrical converters 41 and 42 the heterodyne detection device according to the invention may alternatively be realized by means of only one such converter which, however, means that the radiation from the other output of the coupler 30 is lost. However, in that case the detrimental effect on the signal can be limited by using an asymmetric coupler.

As described in the above-cited Article by O. E. DeLange in the Journal "IEEE Spectrum" of October 1968, pages 77–85, the output signals of the opto-electrical converters 41 and 42 comprise an AC component whose frequency is equal to the difference of the frequencies of the signal beam and the local oscillator beam and whose modulation corresponds to the modulation of the signal beam. The electric signals from the opto-electrical converters 41 and 42 are combined in the differential amplifier 60. Since the AC components of the electric signals from the converters 41 and 42 are in anti-phase, the output signal of the amplifier 60 acquires a maximum value.

For an optimum transmission of the modulation it is necessary that the states of polarisation of the signal beam and the local oscillator beam are equal in spite of the occurrence of changes in the state of polarisation of the signal beam. To compensate for these modifications, two adjustable elements 51 and 52 to influence the state of polarisation are arranged in the radiation path of the signal beam. The elements 51 and 52 may be linearly birefringent elements whose principal axes extend at an angle of 45° to each other, for example, fibre squeezers exerting a pressure on the fibre and hence establishing a birefringent effect, or two elements rotating the direction of polarisation, for example, Faraday rotators. Due to the reversibility of the radiation path by the various elements, the elements 51 and 52 may alternatively be arranged in the radiation path of the local oscillator beam, for example in the positions 52' and 51' shown in broken lines. In the embodiment shown the adjustment of the elements 51 and 52 is controlled from a circuit 70 via the connections 71 and 72. With the aid of small variations around the optimum adjustment, that is to say the adjustment with a maximum signal, a change of the state of polarisation of the signal beam can be detected and the optimum adjustment can be adapted.

Figure 2A:
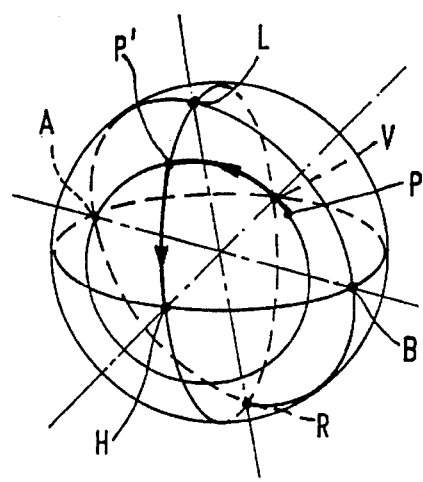
FIGS. 2a and 2b illustrate the operation of this embodiment with reference to the Poincaré sphere.

The operation of the polarisation control according to the invention is illustrated in FIG. 2a by means of the Poincaré sphere. On this sphere each state of polarisation is represented by a point on the spherical surface. The north and south poles, denoted by L and R, of the Poincaré sphere represent the left-hand and right-hand rotating circular states of polarisation and the points on the equator represent the linear states at which an azimuth value of 0° corresponds to the horizontal state of polarisation and 180° corresponds to the vertical state of polarisation. These points are denoted by H and V, respectively. Furthermore the points in the equator plane halfway H and V are denoted by A and B in the FIGS.

The influence of a linearly birefringent element on a state of polarisation corresponds to a rotation around an axis in the equator plane of the Poincaré sphere. A rotation of the state of polarisation corresponds to a rotation around the pole axis L–R. The operation of the elements influencing the state of polarisation will hereinafter be described as the displacement of the points across the surface of the Poincaré sphere corresponding to the state of polarisation.

Assuming that the local oscillator generates horizontal linearly polarized radiation, the point H on the Poincaré sphere, and that the state of polarisation of the signal beam at the output of the optical transmission fibre is represented by the arbitrary point P on the sphere, the polarisation control is to transform the point P to the point H. The polarisation control shown in FIG. 1 achieves this by rotating the point P around the axis H–V in the equator plane to the point P' on the great circle through the poles L and R and the points H and V by means of the element 51, a linearly birefringent element whose principal axis is horizontally or vertically directed with respect to the direction of polarisation of the local oscillator radiation. The second linearly birefringent element 52 whose principal axis extends at an angle of 45° to the principal axis of the first element 51 rotates the point P' around the axis A–B along the great circle to H. The polarisation control may then be adapted in such a way that the point P' always lies on the same hemisphere, which is the upper hemisphere in the FIG. Consequently the control range of the element 52 need not cover more than the range from 0 to π. The element 51 should then have a control range of at least 2π.

Figure 2B:
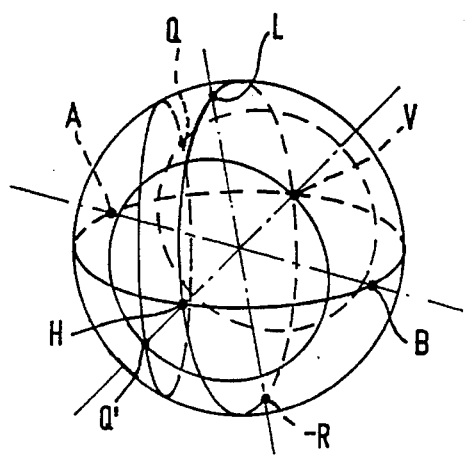

To be able to constantly follow the state of polarisation of the signal beam with elements having a limited control range, at least one of the elements should be varied over 2π while maintaining a sufficient conformity between the states of polarisation of the signal beam and the local oscillator beam. In the above-described embodiment this element is the element 51. FIGS. 2a and 2b illustrate how the adjustment of the element 51 is varied over 2π for two states of polarisation of the signal beam, one on the front hemisphere and one on the rear hemisphere of the Poincaré sphere.

In FIG. 2a the reference P denotes the state of polarisation of the signal beam and H denotes that of the local oscillator beam. The state of polarisation can be changed only with the aid of the element 51 to all points on a circle on the spherical surface whose centre is located on the axis H–V and which passes through the point P. Since that does not change the horizontal component of the polarisation, the signal-to-noise ratio of the ultimately detected signal is constant at such a change of element 51 and since point P is no more remote from point H than 90°, it is at most 3 dB lower than in the case of complete conformity of the two states of polarisation. Consequently, with only a limited signal loss the adjustment of the element 51 can be varied arbitrarily, hence also over 2π. Meanwhile the element 52 is maintained readjusted to zero.

In FIG. 2b the reference Q denotes a state of polarisation on the rear hemisphere of the Poincaré sphere. A change of the adjustment of the element 51 over a range of 2π displaces the state of polarisation at the output of said element over the broken-line circle on the rear hemisphere through Q and around the axis H–V. If the element 52 is adjusted in such a way that the state of polarisation is thereby displaced over π, around the axis A–B, the state of polarisation at the output of the element 52 traverses the broken-line circle through the point Q' on the front side. With this adjustment of the element 52 the points Q and Q' are related to each other by a rotation over π around the axis A–B in the equator plane. Similarly as in the situation illustrated in FIG. 2a the state of polarisation traverses a circle on the front hemisphere of the Poincaré sphere in the case of a change of the adjustment of the element 51 over 2π and in the case of the said adjustment of the element 52, whilst the distance between the state of polarisation and the point H remains equal.

By causing the adjustments of the two birefringent elements 51 and 52 to vary in a coordinated manner, it is possible to achieve a signal-to-noise ratio during a part of the change of the element 51, which ratio is better than the signal-to-noise ratio obtained by means of the above-described procedure. The adjustments may be, for example varied in such a manner that the changed state of polarisation remains on the equator during a part of the cycle.

Similarly as described above a polarisation control according to the invention may alternatively be performed with an element 51 having a range of π and an element 52 having a range of 2π. Then, however, the said limitation of the signal loss to 3 dB is only possible if the readjustment is effected at an instant when the state of polarisation P of the signal beam on the surface of the Poincaré sphere is 90° remote from the point H, i.e. when it is located on the great circle through L, B, R and A. The point P is transformed by means of the element 51 to one of the points A or B in the equator plane. At these points the adjustment of the element 52 does not have any influence on the state of polarisation and the element 52 can be moved over 2π without changing the state of polarisation at the output of this element.

Figure 3A:
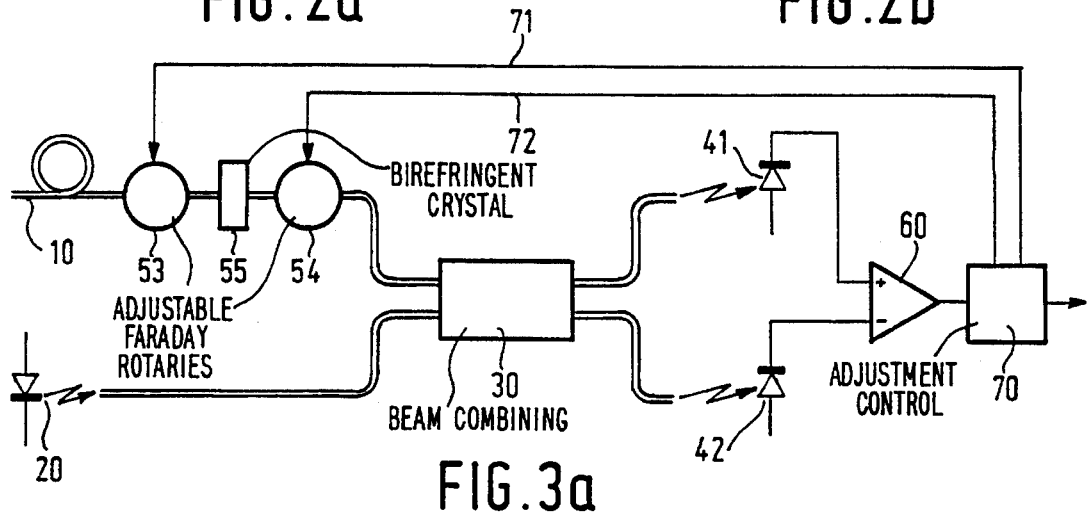
FIGS. 3a and 3b show the embodiment provided with Faraday rotators, illustrating their operation.

The device according to the invention may also comprise elements of a different type influencing the state of polarisation. For example, it is possible to use as adjustable elements two elements rotating the direction of polarisation, such as Faraday rotators between which a stationary linearly birefringent crystal is placed, for example a λ/4 plate whose principal axes extend at an angle of 45° to the horizontal direction of polarisation. Such an embodiment is shown in FIG. 3a in which the reference numerals 53 and 54 denote two elements rotating the direction of polarisation and in which the reference numeral 55 denotes a birefringent crystal. The other elements in FIG. 3a are comparable to the elements in FIG. 1 denoted by the same reference numerals and are not further described.

Figure 3B:
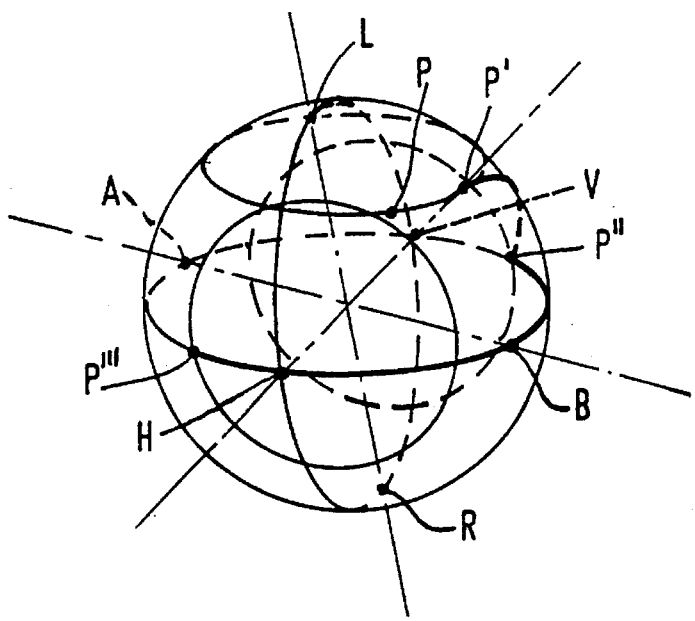

FIG. 3b illustrates a possible use of the device. The state of polarisation P of the signal beam is transferred by the element 53 rotating the direction of polarisation to the point P' on the great circle through the poles L and R and the points A and B in the equator plane. Due to the linearly birefringent element 55 the state of polarisation is rotated through 90° around the axis A–B to the point P" in the equator plane. The second element 54 rotating the direction of polarisation transforms the point P" to the point H.

The adjustment of the element 53 may also be changed over 2π and thus the element can be readjusted because at such a change the point P' is displaced along a circle whose centre is located on the pole axis L–R. The linearly birefringent element 55 transforms the point P' to the point P" on the broken-line circle whose centre is located on the axis H–V. In FIG. 3b this circle is located on the rear hemisphere of the Poincaré sphere. This state of polarisation P" is finally transferred to the point P'" on the front hemisphere by means of the element 54, for example by adjusting said element constantly to a polarisation rotation over π.

During readjustment of one of the control elements 51 or 52 (or 53 or 54) over 2π a loss of signal intensity of at most 3 dB occurs. This is not a significant drawback at a sufficiently large signal intensity, above the so-called "shot noise limit". If the transferred information flow comprises intervals in which the received signal intensity may be less than maximum without a loss of information, the readjustment may be effected during a suitable interval in the information flow. Since the fluctuations in the state of polarisation of the signal beam vary relatively slowly, it is not objectionable to wait for such an interval for some time.

A second embodiment of the optical detection device according to the invention uses several non-adjustable components by which a polarisation control is possible with only one adjustable element and in which the use of a second adjustable element during the readjustment procedure prevents a deterioration of the signal-to-noise ratio.

Figure 4:
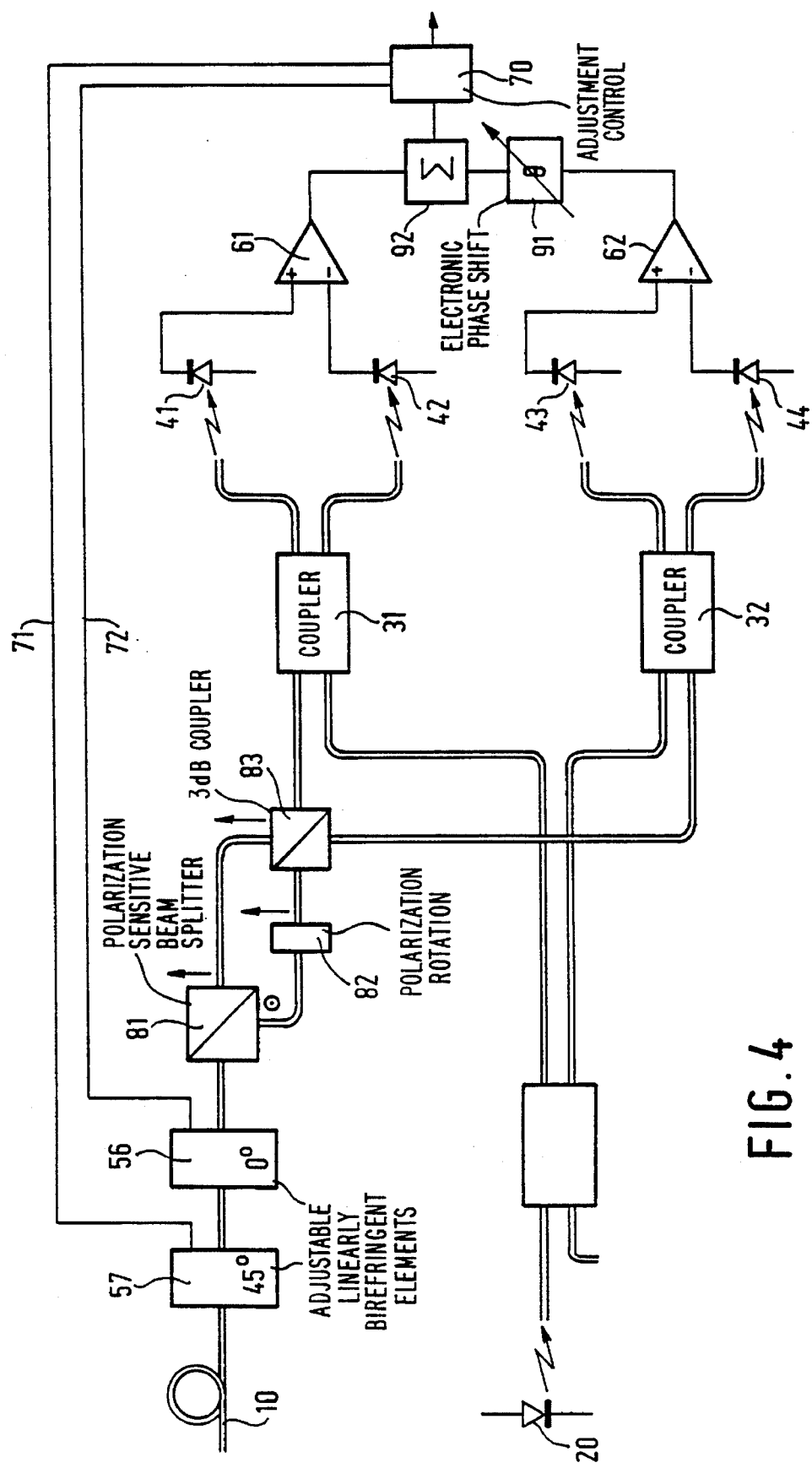
FIG. 4 shows diagrammatically a second embodiment of the device according to the invention.

FIG. 4 shows diagrammatically an embodiment of this polarisation control. Likewise as in the first embodiment, the reference numeral 10 denotes the end part of an optical transmission fibre and the reference numeral 20 denotes a local oscillator. In this embodiment the adjustable elements influencing the state of polarisation are linearly birefringent elements 56 and 57. After the signal beam has traversed these elements, the beam is separated in the polarisation-sensitive beam splitter into two mutually perpendicular and linearly polarized sub-beams. One of these sub-beams traverses a polarisation-rotating element 82, for example a $\lambda/2$ plate arranged at an angle of 45°, which rotates the direction of polarisation of the linearly polarized sub-beam through 90°. The two sub-beams, which now have the same direction of polarisation, are combined by means of, for example, the 3 dB coupler 83 and split into two parts again. The intensity of these two parts is determined by the intensity of and the phase difference between the original horizontally polarized beam component and the original vertically polarized beam component. These parameters are controlled by means of the element 56. The two parts are combined in the couplers 31 and 32 with radiation from the local oscillator 20. The combined radiation exiting at the two outputs of the couplers 31 and 32 is converted by four detectors 41, 42, 43 and 44 into electric signals which are combined two-by-two in the differential amplifiers 61 and 62. By rotating the polarisation ellipse with the aid of the element 56 in such a way that the axes thereof are horizontally and vertically directed, a constant phase difference between the two sub-beams is present at the output of the polarisation-sensitive beam splitter 81.

The electric signals at the outputs of the differential amplifiers 61 and 62 still have a phase difference due to path length differences in the various radiation paths. Correction of this phase difference by means of an electronic phase shift in circuit 91 and addition of the two electric signals by means of a circuit 92 yields the ultimate electric signal which is suitable for further processing, for example for regenerating sound or for composing an image. The adjustable elements 56 and 57 are controlled via the connections 71 and 72 with the aid of the signal detection and control circuit 70.

Figure 5:
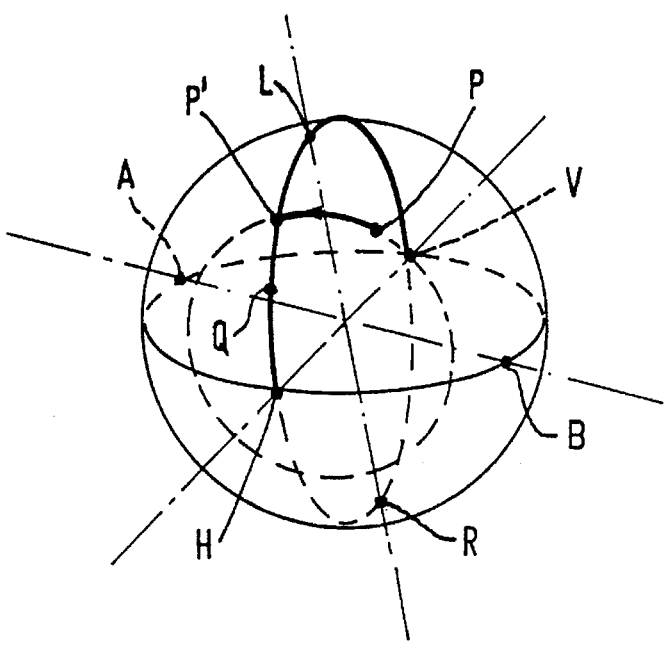
FIG. 5 illustrates the operation of the second embodiment by means of the Poincaré sphere and FIG. 6 shows the variation of the level of the detected signal and the adjustment of the polarisation-influencing elements as a function of time.

The operation of the polarisation control and the course of the readjustment procedure may be best illustrated with reference to the Poincaré sphere as is shown in FIG. 5.

The state of polarisation of the signal beam, the point P, is rotated by means of the adjustable linearly birefringent element 56 around the axis H–V to the point P' on one half of the great circle between the points H and V and through the point L. For the states of polarisation on this circle and hence also for the state denoted by the point P' the phase difference between the horizontal and vertical polarisation components is equal to $\pi/4$. The transformation from the point P to a point on the great circle through L, H, R and V may alternatively be realized in another manner, for example by means of an element rotating the direction of polarisation.

The sub-beams entering at the inputs of the coupler 83 in FIG. 4 are thus not only polarized equally, but have also a constant phase difference after being influenced by the element 56. A change of the original state of polarisation therefore comes to a change of the relative amplitudes of the two components. The phase difference is reduced to zero by suitable choice of the optical path lengths of the two sub-beams between the polarisation-sensitive beam splitter 81 and the coupler 83. The function of the coupler 83 is the equalisation of the amplitude difference of the two sub-beams, which amplitude difference varies with the change of the ellipticity of the signal beam incident on the polarisation-sensitive beam portions.

Readjusting, i.e. changing over an arbitrary number of times $2\pi$, the element 56 is effected at an instant when the state of polarisation of the signal beam is a state Q on the great circle through H, V and the two poles L and R. By means of a second polarisation control element, the linearly birefringent element 57, which is arranged at an angle of 45° to the first element 56 and hence realizes a rotation of the state of polarisation around the axis A–B in the equator plane, the state of polarisation Q is transformed to the point H or the point V. Since the element 56 has no influence on the linear horizontal or vertical state of polarisation from the element 57, element 56 may be varied arbitrarily. After the adjustment of the latter element has been changed over the desired number of times $2\pi$, the element 57 is readjusted to zero again.

Figure 6:
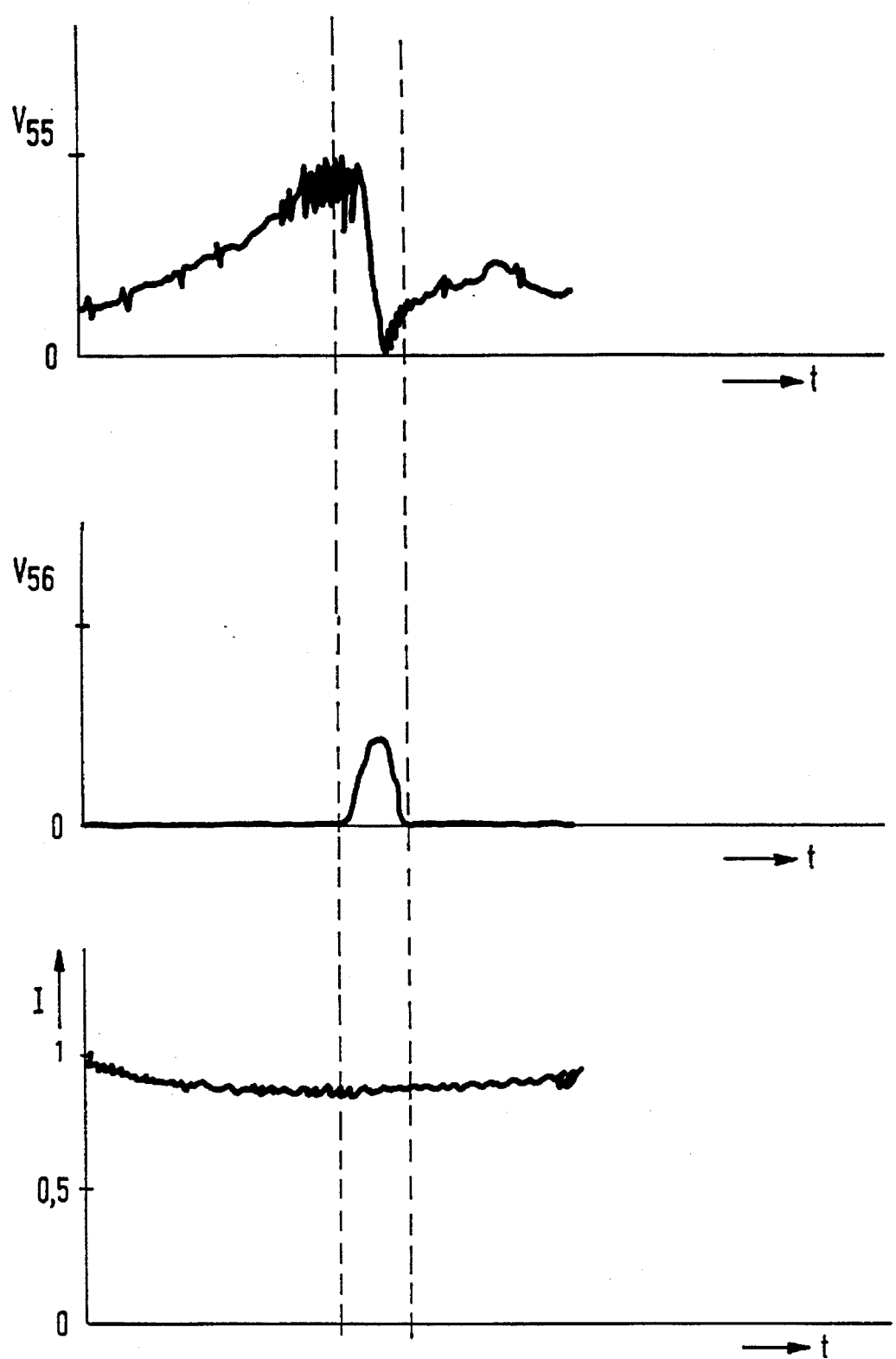

FIG. 6 shows graphically a measurement of the polarisation control and the readjustment procedure in this embodiment according to the invention. The horizontal axis denotes the time variation (t) and the vertical axis denotes the control voltages $V_{55}$ and $V_{56}$ of the two linearly birefringent elements 55 and 56 and the ultimately detected signal intensity I, all on a relative scale.

What is claimed is:

1. A device for optical heterodyne or homodyne detection of an optical signal beam, which device comprises:

a) a local oscillator, b) an input for receiving the signal beam, c) a beam-combining element for combining radiation from the local oscillator with radiation from the signal beam, the beam-combining element supplying combined optical radiation, d) at least one opto-electrical converter for converting the combined optical radiation into an electric signal, e) no more than two adjustable elements, the adjustable elements being for influencing a state of polarisation of either the radiation from the local oscillator or the radiation from the signal beam or both, the adjustable elements having respective limited control ranges, f) a control circuit for adjusting the adjustable elements, so that the adjustable elements provide endless control of the state of polarization, in response to all possible endless variations in the state of polarization of the radiation from the signal beam wherein
   a. the adjustable elements are disposed along a radiation path coupled to an input of said beam-combining element; and further comprising, coupled between the adjustable elements and said beam-combining element:
   b. a polarization sensitive beam splitter, for splitting the radiation path into first and second branches;
   c. a second beam-combining element for combining the first and second branches; and
   d. a state of polarization converter, disposed along the first branch, for converting a state of polarization of radiation in the first branch into an orthogonal state of polarization.

2. A device as claimed in claim 1, wherein the two adjustable elements influencing the state of polarisation are linearly birefringent elements.

3. A device as claimed in claim 1, wherein at least one of the two adjustable elements influencing the state of polarisation is an element rotating the direction of polarisation.

4. The device of claim 1 wherein:
   a. said beam-combining element has first and second outputs; and
   further comprising:
   b. first and second opto-electrical converters coupled to receive radiation from the first and second outputs of said beam-combining element, respectively, said first and second opto-electrical converters being for converting radiation into electrical signals and having respective outputs; and
   c. a differential amplifier having first and second inputs connected to the outputs of the first and second opto-electrical converters, respectively.

5. A device as claimed in claim 4, wherein the two adjustable elements influencing the state of polarisation are linearly birefringent elements.

6. A device as claimed in claim 4, wherein at least one of the two adjustable elements influencing the state of polarisation is an element rotating the direction of polarisation.

7. The device of claim 4 wherein the adjustable elements influence the state of polarization of the signal beam.

8. The device of claim 1 wherein the adjustable elements influence the state of polarization of the signal beam.

9. A device for optical heterodyne or homodyne detection of an optical signal beam, which device comprises:
   a) a local oscillator,
   b) an input for receiving the signal beam,
   c) a beam-combining element for combining radiation from the local oscillator with radiation from the signal beam, the beam-combining element supplying combined optical radiation,
   d) at least one opto-electrical converter for converting the combined optical radiation into an electric signal,
   e) no more than two adjustable elements, the adjustable elements being for influencing a state of polarisation of either the radiation from the local oscillator or the radiation from the signal beam or both, the adjustable elements having respective limited control ranges,
   f) a control circuit for adjusting the adjustable elements, so that the adjustable elements provide endless control of the state of polarization, in response to all possible endless variations in the state of polarization of the radiation from the signal beam wherein
   when a variation of the state of polarization of the signal beam would require one of the adjustable elements to pass an end of its control range, the control circuit adjusts the first and second adjustable elements so that a first beam resulting from any effects of the adjustable elements on the signal beam has a polarization which is at an angle no more than 90° different from a polarization of a second beam resulting from any effects of the adjustable elements on the radiation from the local oscillator, when the polarizations of the first and second beams are represented on a Poincaré sphere, whereby the angles of polarization of the first and second beams differ by no more than 45°; and
   then adjusts the first and second adjustable elements such that if the state of polarization of one of the first and second beams is represented as a first point on the Poincaré sphere, then the state of polarization of the other of the first and second beams follows a circle on the surface of the Poincaré sphere, each point of which circle is at the angle from the first point;
   whereby, the one of the adjustable elements is adjusted away from said end with a signal loss of no more than 3 dB.

10. A device as claimed in claim 9, wherein the two adjustable elements influencing the state of polarisation are linearly birefringent elements.

11. A device as claimed in claim 9, wherein at least one of the two adjustable elements influencing the state of polarisation is an element rotating the direction of polarisation.

12. A receiver suitable for receiving optical signals, provided with a device as claimed in claim 9.

13. The device of claim 9 wherein:
   a. said beam-combining element has first and second outputs; and
   further comprising:
   b. first and second opto-electrical converters coupled to receive radiation from the first and second outputs of said beam-combining element, respectively, said first and second opto-electrical converters being for converting radiation into electrical signals and having respective outputs; and
   c. a differential amplifier having first and second inputs connected to the outputs of the first and second opto-electrical converters, respectively.

14. The device of claim 13 wherein the adjustable elements influence the state of polarization of the signal beam.

15. The device of claim 9 wherein the adjustable elements influence the state of polarization of the signal beam.

16. A device as claimed in claim 15, wherein the two adjustable elements influencing the state of polarisation are linearly birefringent elements.

17. A device as claimed in claim 15, wherein at least one of the two adjustable elements influencing the state of polarisation is an element rotating the direction of polarisation.

18. The device of claim 9 wherein
   a first one of the adjustable elements has a control range of $\pi$ radians; and
   a second one of the adjustable elements has a control range of $2\pi$ radians.

* * * * *